(12) United States Patent
Yokoi et al.

(10) Patent No.: US 8,310,515 B2
(45) Date of Patent: Nov. 13, 2012

(54) EXPOSURE APPARATUS AND IMAGE FORMING APPARATUS PROVIDED WITH THE SAME

(75) Inventors: Junichi Yokoi, Toyoake (JP); Yasuo Tamaru, Nagoya (JP); Yosuke Sugiyama, Gifu (JP); Toshio Sakai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 453 days.

(21) Appl. No.: 12/547,848

(22) Filed: Aug. 26, 2009

(65) Prior Publication Data
US 2010/0053585 A1 Mar. 4, 2010

(30) Foreign Application Priority Data

Aug. 26, 2008 (JP) .................. 2008-216613

(51) Int. Cl.
*B41J 15/14* (2006.01)
*B41J 27/00* (2006.01)
*B41J 2/435* (2006.01)
*G03G 15/00* (2006.01)
*G03G 15/02* (2006.01)

(52) U.S. Cl. ........ 347/242; 347/245; 347/257; 347/263; 399/107; 399/116

(58) Field of Classification Search .............. 347/84–88, 347/242, 245, 257, 263; 399/107–126
See application file for complete search history.

(56) References Cited

U.S. PATENT DOCUMENTS

| 5,089,846 A | 2/1992 | Tabuchi |
| 6,809,752 B2 * | 10/2004 | Nagamine .................. 347/238 |
| 7,187,501 B2 * | 3/2007 | Wakisaka ................... 359/622 |
| 7,825,946 B2 * | 11/2010 | Sugiyama et al. ............ 347/242 |

FOREIGN PATENT DOCUMENTS

| JP | 4-096082 A | 3/1992 |
| JP | H06-207469 A | 7/1994 |
| JP | 08-318661 | 12/1996 |
| JP | 2002-311662 A | 10/2002 |
| JP | 2003-112446 A | 4/2003 |
| JP | 2004-177824 A | 6/2004 |
| JP | 2007-65125 A | 3/2007 |

OTHER PUBLICATIONS

Notice of Reasons for Rejection mailed Aug. 31, 2010 in Japanese Patent Application No. 2008-216613 and English translation thereof.

* cited by examiner

*Primary Examiner* — Stephen Meier
*Assistant Examiner* — Jeremy Bishop
(74) *Attorney, Agent, or Firm* — Banner & Witcoff, Ltd.

(57) ABSTRACT

An exposure apparatus which exposes an object includes an exposure member which has a plurality of blinking sections and which is elongated in a predetermined longitudinal direction; a support frame which supports the exposure member; a holder which supports the support frame to be movable relative to the holder; and a pressing member which is provided between the holder and the support frame and which presses the support frame in a direction away from the holder. Accordingly, the exposure apparatus can suppress the deformation of the exposure member.

9 Claims, 11 Drawing Sheets

EXPOSURE APPARATUS AND IMAGE FORMING APPARATUS PROVIDED WITH THE SAME

CROSS REFERENCE TO RELATED APPLICATION

The present application claims priority from Japanese Patent Application No. 2008-216613 filed on Aug. 26, 2008 the disclosure of which is incorporated herein by reference in its entirety.

BACKGROUND OF THE INVENTION

1. Field of the Invention

The present invention relates to an exposure apparatus provided with an exposure member, such as an LED head, which has a plurality of blinking sections (intermittent light-emitting sections), and to an image forming apparatus provided with the exposure apparatus.

2. Description of the Related Art

An image forming apparatus disclosed in Japanese patent publication No. 3153103B2 (Japanese Patent Application Laid-open No. H8-318661, published Dec. 3, 1996) includes a photoconductive drum (photosensitive drum), an LED head which has a plurality of pieces of LED which expose the photoconductive drum, and an upper cover which supports the LED head and which is rockable upward and downward with respect to the body of the image forming apparatus while the cover supports the LED head. Specifically, in this technique, the LED head is engaged with the upper cover such that both left and right ends of the LED head are engaged with elongated holes, formed in flange portions of the upper cover at both left and right ends of the upper cover, respectively; and a coil spring is provided between the upper cover and the LED head to bias the LED head in a direction in which the LED head is away from the upper cover.

According to this technique, when the upper cover is closed, a projection which is formed on the lower surface of the LED head, pressed by the coil spring, enters into a cylindrical positional hole having a bottom surface and formed in a cartridge supporting the photoconductive drum, thereby positioning the LED head with respect to the body of the image forming apparatus. On the other hand, when the upper cover is opened, the LED head is pressed by the coil spring against the flange portions of the upper cover.

In this conventional technique, however, there is a fear that when the upper cover is opened, the LED head pressed by the coil spring might be warped with the flange portions as the center of warpage, and thus the LED head might be deformed.

SUMMARY OF THE INVENTION

An object of the present invention is to provide an exposure apparatus which is capable of suppressing the deformation of the LED head (exposure member). Another object of the present invention is to provide an image forming apparatus provided with the exposure apparatus.

According to a first aspect of the present invention, there is provided an exposure apparatus which exposes an object, the exposure apparatus including an exposure member which has a plurality of blinking sections and which is elongated in a predetermined longitudinal direction; a support frame which supports the exposure member; a holder which supports the support frame to be movable relative to the holder; and a pressing member which is provided between the holder and the support frame and which presses the support frame in a direction away from the holder.

According to the first aspect of the present invention, the exposure apparatus is provided with the holder which supports the support frame, supporting the exposure member, so that the support member is movable relative to the holder, wherein the pressing member is provided between the holder and the support frame. For example, when the upper cover on which the holder is supported is opened, the pressing force from the pressing member is suppressed by the support frame and thus is hardly exerted to the exposure member, thereby making it possible to suppress the deformation of the exposure member.

According to a second aspect of the present invention, there is provided an image forming apparatus which forms an image on an object, the image forming apparatus including the exposure apparatus according to the first aspect of the invention; a photoconductive body which is exposed by the exposure apparatus so that an electrostatic latent image is formed on a surface of the photoconductive body; a transfer unit which transfers the electrostatic latent image, formed on the photoconductive body, to the object; and a fixing unit which fixes the image, transferred to the object by the transfer unit, on the object.

According to the second aspect of the present invention, the image forming apparatus is provided with the exposure apparatus including the holder which supports the support frame, supporting the exposure member, so that the support member is movable relative to the holder, wherein the pressing member is provided between the holder and the support frame. With this, the pressing force from the pressing member is suppressed by the support frame and thus is hardly exerted to the exposure member, thereby making it possible to suppress the deformation of the exposure member. Thus, the image forming apparatus is capable of forming an image with high quality

DESCRIPTION OF THE PREFERRED EMBODIMENTS

Figure 1:
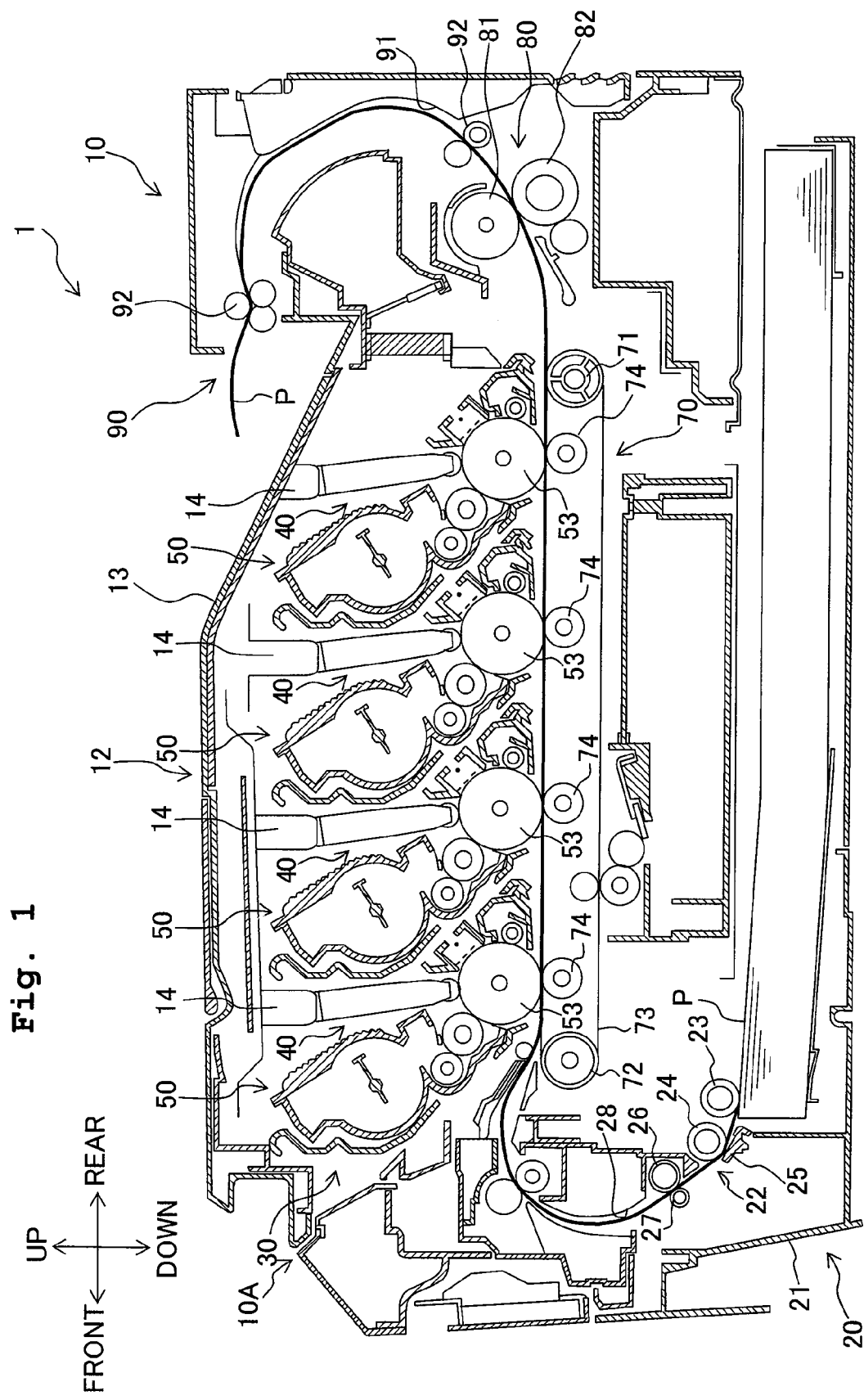
FIG. 1 is a cross-sectional view of the overall construction of a color printer as an example of image forming apparatus.

In the following, a detailed explanation will be given about an embodiment of the present invention, while appropriately referring to the drawings. In the relevant drawings, FIG. 1 is a cross-sectional view of the overall construction of a color printer as an example of image forming apparatus. Note that in the following explanation, the overall construction of the color printer is first described, and then the parts or components characteristic to the present invention will be described.

The following explanation will be given with the directions, with a user when using the color printer as the reference. Namely, in FIG. 1, the left side on the sheet surface is "front (forward) side"; the right side on the sheet surface is "rear (backward or far) side"; and the up and down direction in the sheet surface is "up and down direction". Further, in a direction perpendicular to the sheet surface, the far side on the sheet surface is "left side" and the front side on the sheet surface is "right side".

As shown in FIG. 1, a color printer 1 is provided with, in a body 10 (apparatus body 10) of the color printer, a paper feeding section 20 which feeds a sheet of paper P (paper sheet P; paper P), an image forming section 30 which forms an image on the paper sheet P fed from the paper feeding section 20, and a paper discharging section 90 which discharges the paper sheet P on which an image is formed by image forming section 30.

An opening 10A is formed on the body 10 at the upper portion of the body 10. An upper cover 12 as an example of an open/close cover which is pivotably supported, is arranged at the upper portion of the body 10, and covers the opening 10A such that the opening 10A can be opened and closed. The upper surface of the upper cover 12 is a discharged paper tray 13 in which the paper P discharged from the body 10 is accumulated; and a plurality of LED-attachment members 14 supporting LED units 40 respectively (to be described later) are arranged in the lower surface of the upper cover 12.

The paper feeding section 20 is arranged in the body 10 at the lower portion of the body 10, and mainly includes a paper feed tray 21 which is detachably arranged inside the body 10 and a paper supply mechanism 22 which supplies the paper P from the paper feed tray 21 to the image forming section 30. The paper supply mechanism 22 is arranged in the front side of the paper feed tray 21, and is mainly provided with a paper feed roller 23, a separation roller 24 and a separation pad 25.

In the paper feeding section 20, sheets of the paper P in the paper feed tray 21 are separated one by one and fed upward, and paper powder on the paper P is removed while passing between a paper-powder removing roller 26 and a pinch roller 27; and then the paper P is turned (flipped) backward while travelling on a transport path 28, and is supplied to the image forming section 30.

The image forming section 30 mainly includes four pieces of LED unit 40, four pieces of process cartridge 50, a transfer unit 70 and a fixing unit 80.

The LED units 40 are rockably connected to the LED-attachment members 14 respectively and are positioned appropriately with respect to the body 10 with a positioning member provided on the body 10. The detailed construction of the LED units 40 will be described later on.

The process cartridges 50 are arranged between the upper cover 12 and the paper feeding section 20 to be aligned in a row in the front/rear direction. Each of the process cartridges 50 is provided with a photoconductive drum 53 as an example of the photoconductive body on which an electrostatic latent image is formed; and publicly known electrostatic charger, developing roller, tonner container, etc. which are shown in the drawing while omitting reference numerals thereof.

The transfer unit 70 is arranged between the paper feeding section 20 and the process cartridges 50, and mainly includes a driving roller 71, a driven roller 72, a transport belt 73 and a transfer roller 74.

The driving roller 71 and the driven roller 72 are arranged to be parallel and away from each other in the front/rear direction. The transport belt 73 formed of an endless belt is arranged to be stretched between the driving roller 71 and the driven roller 72. The transport belt 73 makes contact with the respective photoconductive drums 53 on the outer surface of the transport belt 73. On the inner surface side of the transport belt 73, four pieces of the transfer roller 74 are arranged to be opposite to (to face) the photoconductive drums 53, respectively. The transfer rollers 74 pinch and hold the transport belt 73 between the transport rollers 74 and the photoconductive drums 53 respectively. Upon performing the transfer, transfer bias is applied to the transport rollers 74 by constant current control.

The fixing unit 80 is arranged in the body 10 on the rear side with respect to the process cartridges 50 and the transfer unit 70, and is provided with a heating roller 81 and a pressure roller 82 which is arranged facing the heating roller 81 and which presses the heating roller 81.

In the image forming section 30, at first, the surface of each of the photoconductive drums 53 is uniformly charged by the charger, and then is exposed by one of the LED units 40. With this, the electric potential is lowered on each of the photoconductive drums 53 at the exposed portion thereof, and an electrostatic latent image based on an image data is formed on each of the photoconductive drums 53. Afterwards, tonner is supplied by the developing roller to the electrostatic latent image, thereby making a tonner image be held on each of the photoconductive drums 53.

When paper P supplied on the transport belt 73 is made to pass between each of the photoconductive drums 53 and one of the transfer rollers 74 arranged on the inside of the transport belt 73, the tonner image formed on each of the photoconductive drums 53 is transferred onto the paper P. Afterwards, when the paper P is made to pass between the heating roller 81 and the pressure roller 82, the tonner image transferred onto the paper P is thermally fixed on the paper P.

The paper discharging section 90 mainly includes a paper-discharge side transport path 91 which is extended upward from the outlet (outlet port) of the fixing unit 80 and is formed to be turned (flipped) backward toward the front side, and a plurality of pairs of transport rollers 92 which transport the paper P. The paper P, on which the tonner image is transferred and thermally fixed, is transported on the paper-discharge side transport path 91 by the transport rollers 92, is discharged to the outside of the body 10, and is accumulated in the discharged paper tray 13.

<Construction of the LED Unit>

Figure 2:
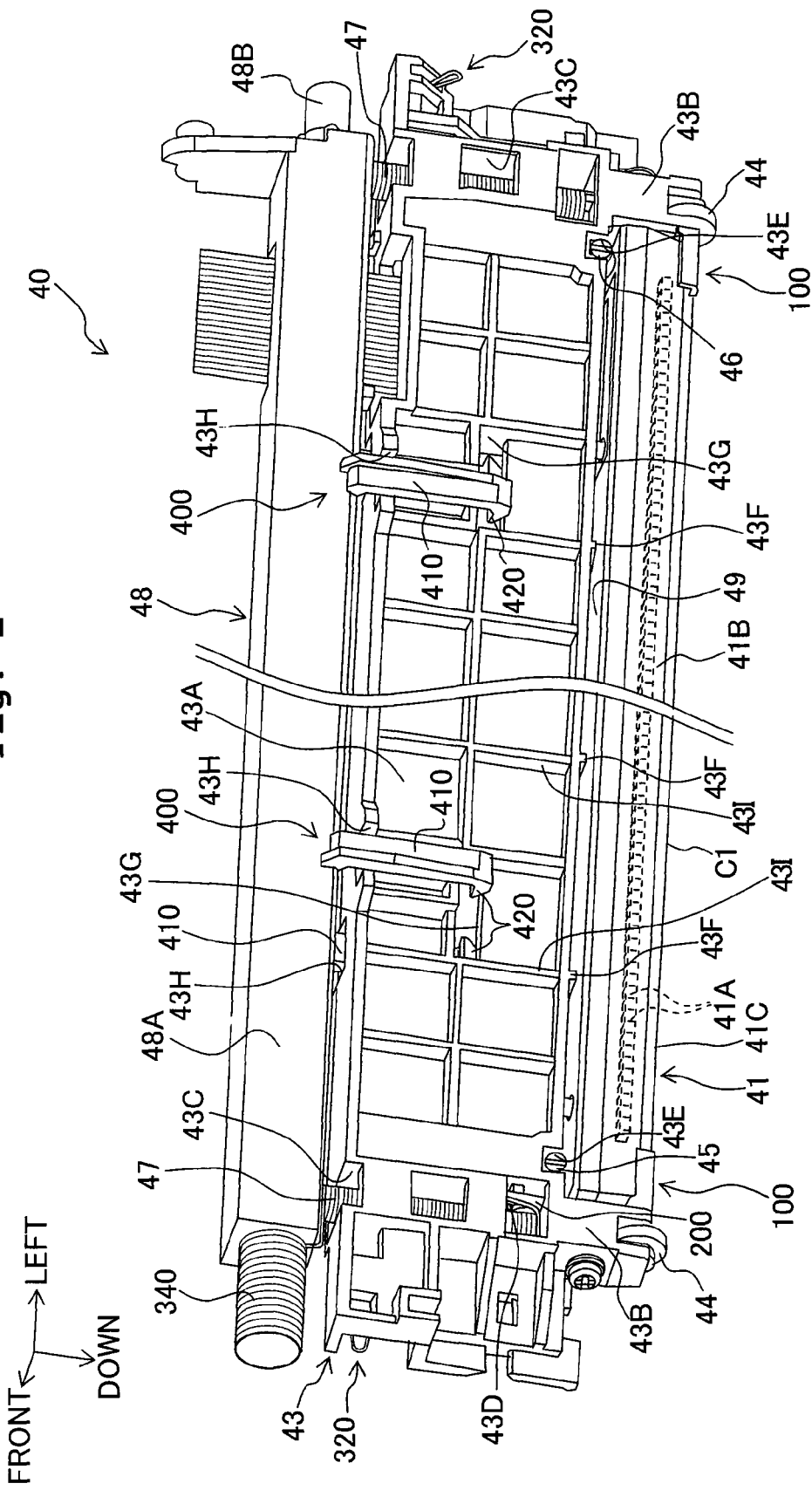
FIG. 2 is a perspective view of an LED unit as seen from the rear side thereof.
Figure 3:
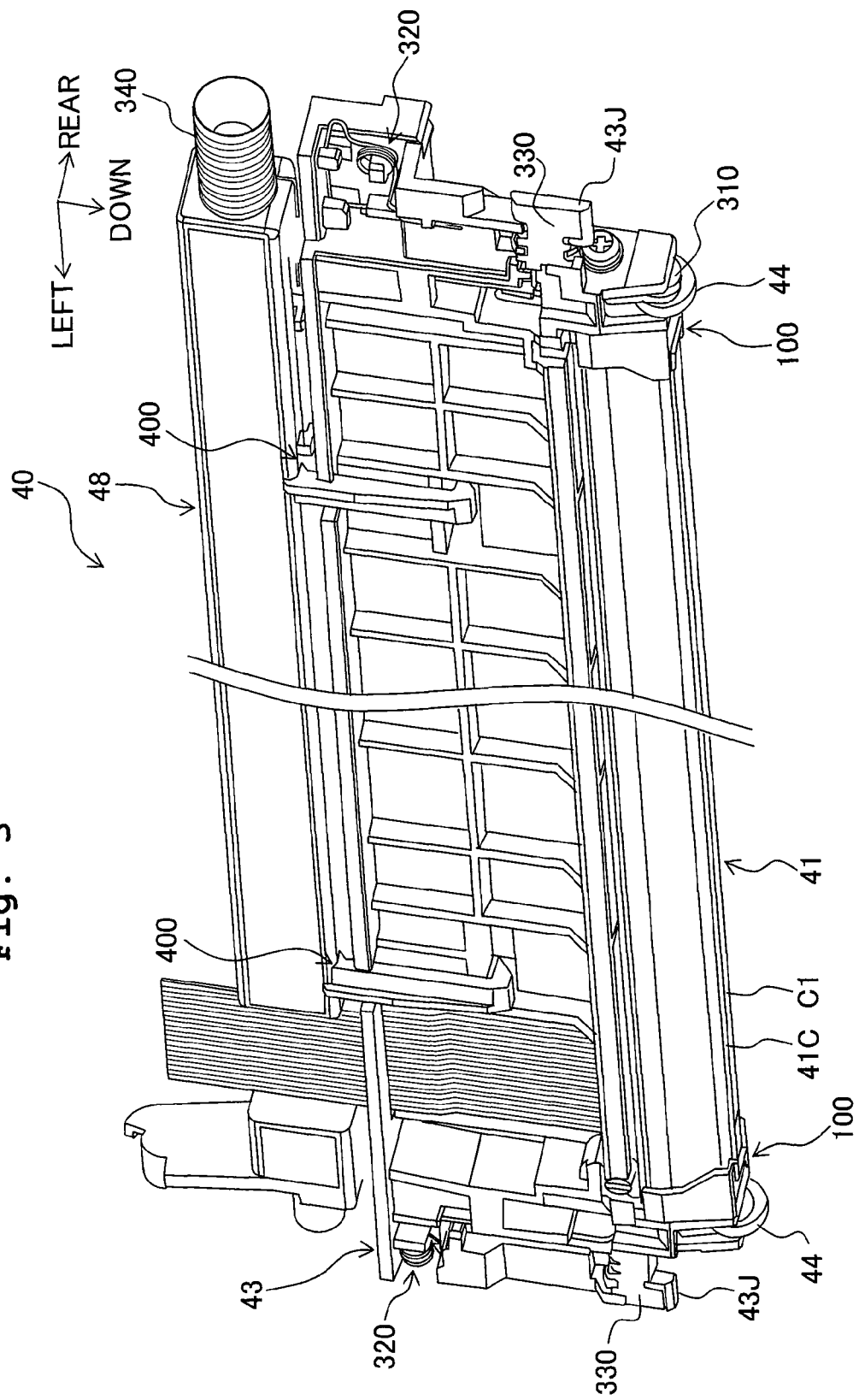
FIG. 3 is a perspective view of the LED unit as seen from the front side thereof.
Figure 4:
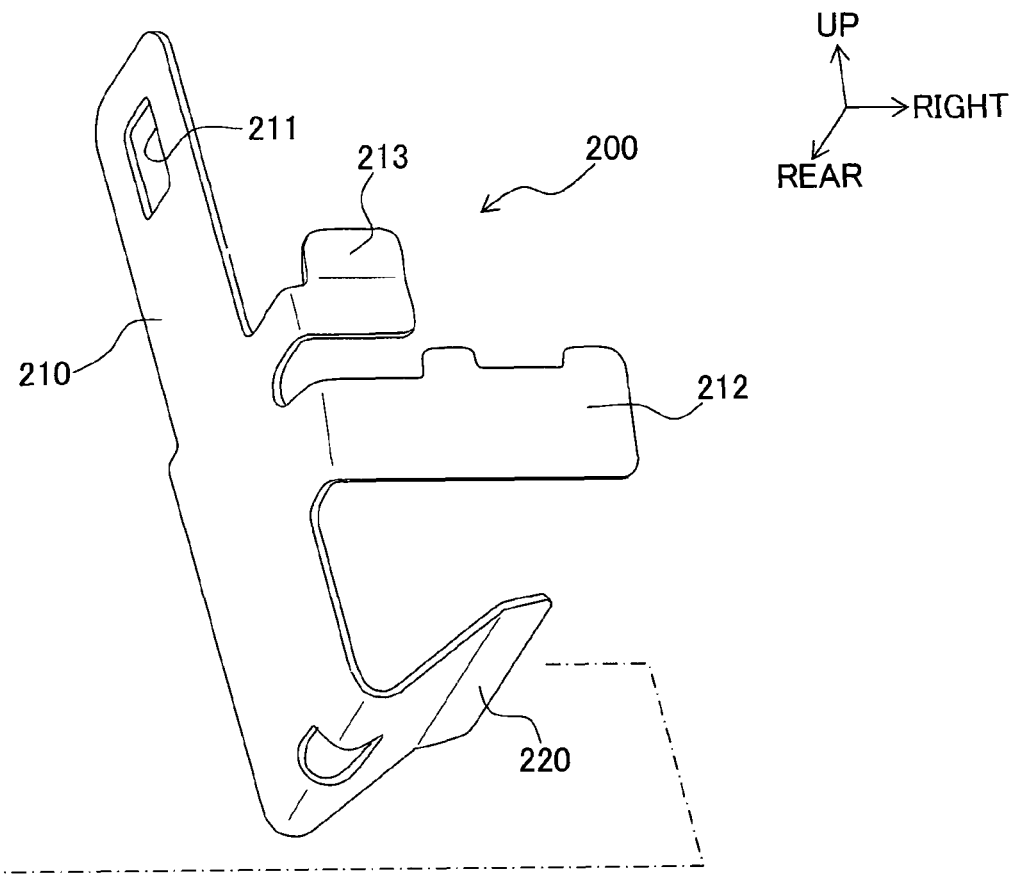
FIG. 4 is a perspective view showing a cover and a leaf spring.
Figure 4:
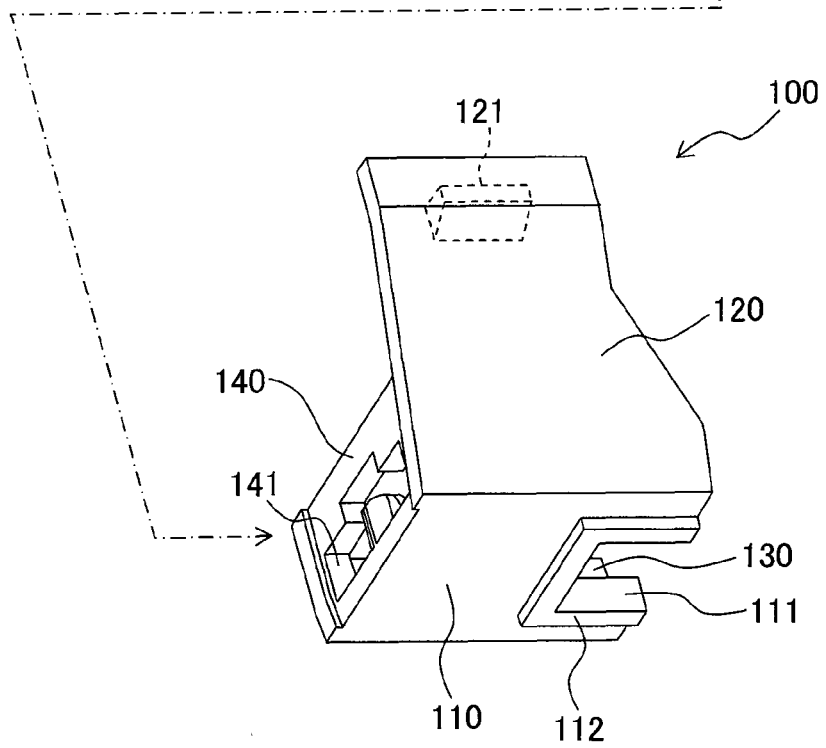
Figure 5:
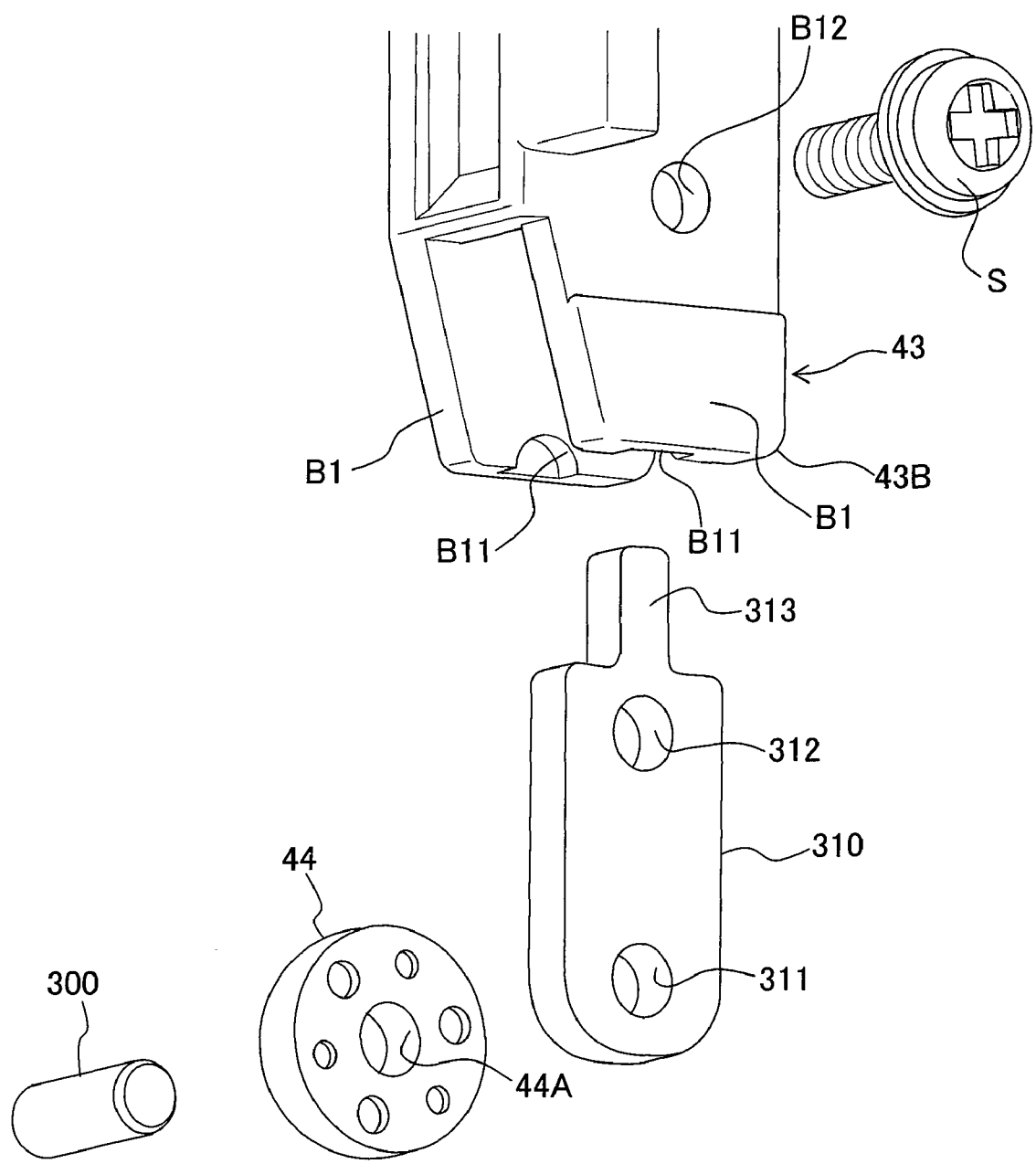
FIG. 5 is an exploded perspective view of the construction around a guide roller.

A detailed explanation will be given about an LED unit 40 as the characteristic part of the present invention. In the relevant drawings, FIG. 2 is a perspective view of the LED unit as seen from the rear side thereof; FIG. 3 is a perspective view of the LED unit as seen from the front side thereof; FIG. 4 is a perspective view showing a cover and a leaf spring; and FIG. 5 is an exploded perspective view of the construction around a guide roller.

As shown in FIGS. 2 and 3, the LED unit 40 mainly includes an elongated LED head 41 as an example of the exposure member; a support frame 43 made of resin; two guide rollers 44 as an example of the distance-maintaining member; two eccentric cams 45, 46 as an example of the adjusting member; and a holder 48.

<LED Head 41>

The LED head 41 includes a plurality of LED arrays 41A formed of a large number of LEDs arranged on a semiconductor chip; a head frame 41B as an example of housing; and a lens array 41C. In the embodiment, the blinking sections (intermittent light-emitting sections) are constructed, as an example, of the plurality of LED arrays 41A and the lens array 41C.

The LED arrays 41A are aligned in a row in accordance with a predetermined pixel pitch in the left and right direction (axis direction of the photoconductive drum 53), and when the LED arrays 41A are driven selectively, the LED arrays 41A emit light appropriately and intermittently toward the photoconductive drum 53. Specifically, a signal is inputted, based on data of an image to be formed, from an unillustrated controller to each of the LED arrays 41A, thereby causing the LED arrays 41A to emit the light to expose the photoconductive drum 53.

The head frame 41B is formed of resin and supports the LED arrays 41A and the lens array 41C. Note that since the head frame 41B is made of resin, it is possible to realize a compact sized LED head 41 with a low cost and to suppress electric discharge from a high-voltage part such as the electrostatic charger.

On the upper surface of the head frame 41B, a sheet metal 49 is arranged to extend in the longitudinal direction of the head frame 41B. With this, the LED head 41 is reinforced by the sheet metal 49.

The lens array 41C causes the light emitted from each of the LED arrays 41A to focus on the photoconductive drum 53, and is constructed by aligning, in a row, GRIN lenses (cylindrical shaped lenses) made of glass as an example of gradient index lens which has a light-exit surface formed in a planar shape.

The lens array 41C is formed to have an elongated shape extending in the axis direction of the photoconductive drum 53, and is fixed to the head frame 41B in a state that the lens array 41C protrudes downward from the lower surface of the head frame 41B, except that the lens array 41C is not provided on small portions in the both end sides of the head frame 41B. Two resin covers 100, which are softer than the lens array 41C, are arranged at the both end portions of the lens array 41C, respectively.

<Cover 100>

As shown in FIG. 4, the cover 100 includes a lower wall portion 110, a front wall portion 120, a rear wall portion 130 and a side wall portion 140.

The lower wall portion 110 is arranged to face or to be opposite to the lower surface of the head frame 41B included in the LED head 41. A "U"-shaped cutout 111 is formed on an edge portion, of the lower wall portion 110, on the inner side in the left and right direction and along the end portion of the lens array 41C. Further, a protection wall 112 is formed around the cutout 111 to project downward and surround the end portion (corner portion) of the lens array 41C.

The protection wall 112 is formed to have a height such that the lower end (tip end portion) of the protection wall 112 is projected downward to a position below the lower surface (light-exit surface) of the lens array 41C. Note that it is enough that the height of the protection wall 112 is flush with or higher than the light-exit surface of the lens array 41C, and it is also allowable that the lower end of the protection wall 112 is flush with the light-exit surface of the lens array 41C. Here, the term "height to be flush with or higher than" means that the protection wall 112 has a height such that the end portion of the protection wall 112 is located at a position same as that of the light-exit surface of the lens array 41C or to be projected to the position below the light-exit surface.

The front wall portion 120 is formed to have a height substantially same as the height in the up and down direction of the LED head 41. Further, an engagement projection 121, which is engaged with an engagement arm portion 212 of a leaf spring 200 (to be explained later on), is formed in the front wall portion 120 at an upper portion in the back surface of the front wall portion 120.

The rear wall portion 130 is formed to have a height lower than that of the front wall portion 120, and is arranged to be opposite (to face) the LED head 41 at a lower portion in the back surface of the LED head 41.

The side wall portion 140 is formed to have a height substantially same as that of the rear wall portion 130, and is arranged to face the left or right side wall of the LED head 41. An insertion hole 141 is formed on the side wall portion 140 at the lower portion thereof. The insertion hole 141 is formed to have a rectangular shape into which a lower wall portion 220 of the leaf spring 200 is inserted, as will be explained later on.

<Leaf Spring 200>

The leaf spring 200 mainly includes a side wall portion 210 and a lower wall portion 220 and is bent in a "V"-shaped form.

The side wall portion 210 is formed to have a length greater than the height in the up and down direction of the LED head 41. An insertion hole 211, which has a substantially rectangular form and which is engaged with an engagement projection 43D (to be described later; see FIG. 2) of the support frame 43, is formed in the side wall portion 210 at an upper portion of the side wall portion 210.

Further, an engagement arm portion 212, which is engaged with the engagement projection 121 of the cover 100 from below, and a grounding arm portion 213 which is arranged above or over the engagement arm portion 212 and which is brought into contact with the sheet metal 49 of the LED head 41 (see FIG. 7) are formed on an front end portion of the side wall portion 210.

The lower wall portion 220 of the leaf spring 200 is inserted to the insertion hole 141 of the cover 100 and the engagement projection 121 of the cover 100 is inserted between the engagement arm portion 212 and the grounding arm portion 213 of the leaf spring 200, thereby attaching the cover 100 to the leaf spring 200. Further, in this state, by making the engagement hole 211 formed in the upper end of the leaf spring 200 be hooked to the engagement projection 43D (to be described later; see FIG. 2) of the support frame 43, the LED head 41 is biased to be pulled toward the support frame 43, at the lower wall portion 220 of the leaf spring 200.

With this, the LED head 41 is supported by the support frame 43 via the leaf spring 200. In this state, the cover 100 is pressed upward at the side wall portion 140 and the engagement projection 121 thereof by the lower wall portion 220 and the engagement arm portion 212 of the leaf spring 200, so that the engagement projection 121 is pressed against the LED head 41, thereby fixing the cover 100 to the LED head 41.

Namely, the LED head 41 and the cover 100 (engagement projection 121) are held by the leaf spring 200 and the support frame 43. Note that the cover 100 is constructed such that a small clearance (gap) is provided between the cover 100 and the LED head 41, at a portion different from the engagement projection 121, so as to prevent the cover 100 from contacting with the LED head 41 except at the engagement projection 121.

<Support Frame 43>

As shown in FIGS. 2 and 3, the support frame 43 includes a base portion 43A elongated in the left and right direction, and a pair of extending portions 43B extending downward from both ends of the base portion 43A, respectively.

Coil-spring accommodating portions 43C are formed on the upper surface of the base portion 43A at the left and right side portions, respectively. Each of the coil-spring accommodating portions 43C is a downward recess having a bottomed cylindrical shape. A coil spring 47, as an example of the pressing member which presses the support frame 43 toward or against the photoconductive drum 53 located below the support frame 43, is arranged inside each of the coil-spring accommodating portions 43C. Further, a hole (of which reference numeral is omitted) is formed in the bottom surface (bottom wall) of the coil-spring accommodating portion 43C, and the upper end portion of the leaf spring 200 is insertable (inserted) to this hole from below.

Furthermore, the engagement projection 43D, which is engaged with the rectangular engagement hole 211 (see FIG. 4) formed in the upper end of the leaf spring 200, is formed in the inner circumference surface of the coil-spring accommodating portion 43C. Moreover, two bearing portions 43E, which rotatably support the eccentric cams 45, 46 respectively, are formed in the base portion 43A on the lower surface on the left and right side portions thereof, respectively.

A plurality of projection portions 43F which project toward the LED head 41 are formed on the lower surface of the base portion 43A. The respective projection portions 43F are arranged between the pair of eccentric cams 45 and 46, and are arranged in the longitudinal direction of the LED head 41 at a predetermined spacing distance. Further, the base portion 43A has ribs 431, and the projection portions 43F are formed in a virtual line extended in the optical axis direction of the ribs 431, respectively.

Here, each of the projection portions 43F is constructed so as not to come into contact with the LED head 41 when each of the eccentric cams 45 and 46 is in a phase in which the LED head 41 and the base portion 43A are closest to each other. In other words, each of the projection portions 43F is formed such that, when the LED head 41 which is moved upward and downward by the rotation of the eccentric cams 45 and 46 approaches closest to the support frame 43, the projection portion 43F is located to be higher than (above) the upper surface of the LED head 41.

Holes 43G are formed in the base portion 43A at portions on the inner side (inner-side portions) in the left and right direction with respect to the coil-accommodating portions 43C, respectively. The holes 43G are formed penetrating, in the front and rear direction, the inner-side portions of the base portion 43A on the left and right sides, respectively; and pawls 420 of a pair of hooks 400 (to be described later) are engaged with the holes 43G. Further, a plurality of recessed portions 43H each of which can accommodate a portion of an arm 410 of each of the hooks 400 (to be described later) are formed in the support frame 43 at portions above the holes 43G, corresponding to the arms 410, respectively.

Each of the extending portions 43B is provided with a guide roller 44 at the lower end portion of the extending portion 43B. Specifically, as shown in FIG. 5, the extending portion 43B has a pair of two-pronged (bifurcate) side wall portions B1 formed in the lower portion of the extending portion 43B; and a positioning portion B11 which is a recess (groove) having a substantially semicircular shape is formed in each of the side wall portions B1 on the inner wall surface at the lower end portion thereof. Further, an insertion hole B12 into which a screw S is insertable is formed in one side wall portion B1, of the pair of side wall portions B1, on the outer side in the left and right direction, at an upper portion of the one side wall portion B1.

<Guide Roller 44>

The guide roller 44 is a disc-shaped member made of resin and has a through hole 44A which is formed in the central portion of the guide roller 44 and through which a metallic roller shaft 300 is insertable. The roller shaft 300 is positioned with respect to the support frame 43 by being pressed, with a metal plate 310, against the positioning portions B11 of the support frame 43; and the roller shaft 300 is fixed unrotatably to the support frame 43 by the friction forces between the roller shaft 300 and the positioning portions B11 and between the roller shaft 300 and the metal plate 310.

The metal plate 310 is constructed to include an insertion hole 311 into which the roller shaft 300 is inserted, a screw hole 312 formed above the insertion hole 311, and a grounding projection 313 extending upward from the upper end of the metal plate 310. The tip portion (end portion) of the grounding projection 313 is passed through an unillustrated hole formed in the bottom wall of the coil-spring accommodating portion 43C (see FIG. 2) and then is arranged inside the coil-spring accommodating portion 43C.

Upon attaching the guide roller 44 to the support frame 43, at first, the roller shaft 300 is inserted through the through hole 44A of the guide roller 44 and the insertion hole 311 of the metal plate 310, and then the guide roller 44 and the metal plate 310 are inserted between the pair of side wall portions B1 of the support frame 44, and the roller shaft 300 is made to abut against the positioning portions B11.

Afterwards, the metal plate 310 is inserted further into the support frame 43 such that the roller shaft 300 is strongly pressed against the positioning portions B11. In this state, the screw S is passed through the insertion hole B12 formed in the side wall portion B1 to screw the screw S to the screw hole 312 of the metal plate 310, thereby unrotatably fixing the roller shaft 300 with respect to the support frame 43 in a state that the roller shaft 300 is strongly pressed against the support frame 43. With this, the guide roller 44 is rotatably supported to the roller shaft 300 which is unrotatable with respect to the support frame 43.

The biasing force from the coil spring 47 is transmitted via the support frame 43 to the guide roller 44 supported in such a manner, to thereby press the guide roller 44 against the photoconductive drum 53 so that the guide roller 44 is driven following the driving of the photoconductive drum 53. With this, even in a case that the photoconductive drum 53 is eccentric, the spacing distance (clearance) in the optical axis direction between the photoconductive drum 53 and the LED head 41 supported by the support frame 43 is maintained by the guide roller 44.

The metal plate 310, which fixes the roller shaft 300 to the support frame 43 as described above, is electrically grounded. In the following, an explanation will be given about this grounding structure with reference to FIGS. 6 and 7. In the relevant drawings, FIG. 6 is a perspective view of metal parts, as seen obliquely from the rear side thereof, provided for grounding the metal plate; and FIG. 7 is a perspective view of the metal parts, as seen obliquely from the front side thereof, provided for grounding the metal plate.

<Grounding Structure for Grounding the Metal Plate 310>

Figure 6:
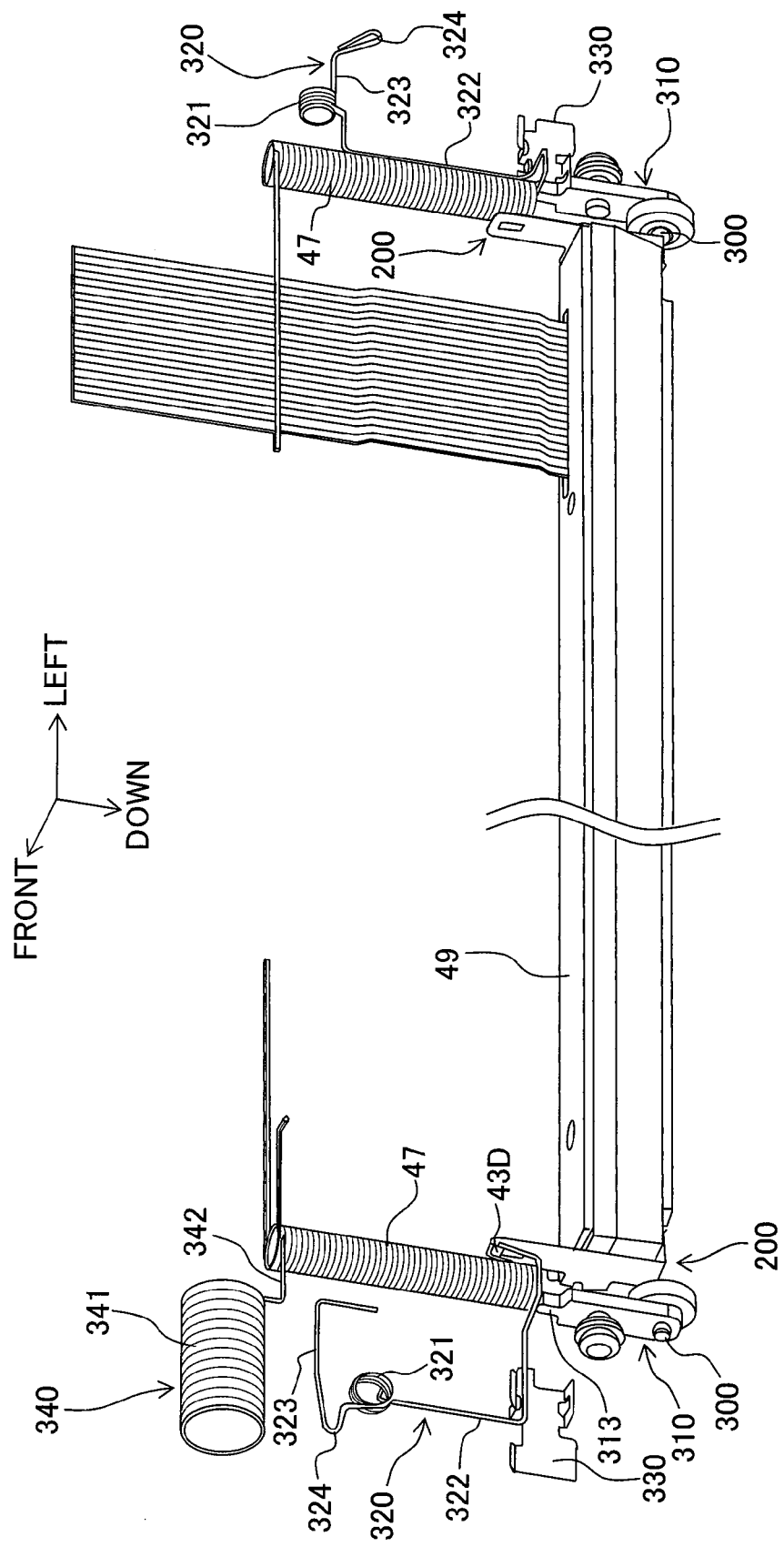
FIG. 6 is a perspective view of metal parts, as seen from the rear side thereof, provided for grounding a metal plate.
Figure 7:
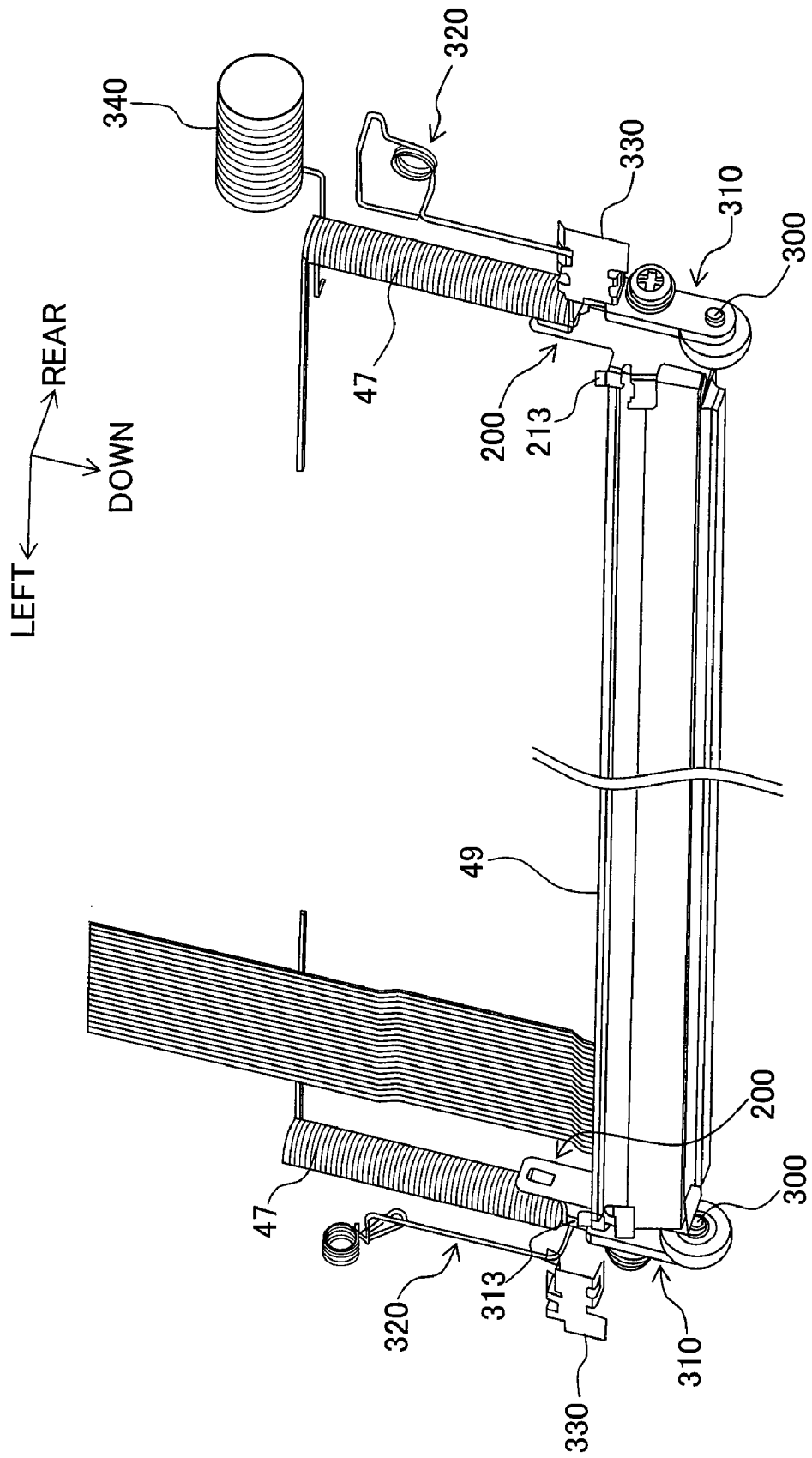
FIG. 7 is a perspective view of the metal parts, as seen from the front side thereof, provided for grounding the metal plate.

As shown in FIGS. 6 and 7, the metal plate 310 is electrically grounded via a wire spring 320, a grounding plate 330, the coil spring 47, a holder-side coil spring 340, the leaf spring 200 and the sheet metal 49 which are provided on the LED unit 40 and via an unillustrated metal frame provided on the body 10 or the upper cover 12.

The wire spring 320 is fixed to the support frame 43 (see FIGS. 2 and 3), and is constructed to mainly include a coil-spring portion 321, a pressing arm portion (first arm portion) 322 and a contact-arm portion (second arm portion) 323. The pressing arm portion 322 is formed to have a substantially "L"-shape extending downward from the coil-spring portion 321 and then directing toward the inner side in the left and right direction of the support frame 43. The pressing arm portion 322 presses, at the tip portion thereof, the upper end portion of the leaf spring 200 against the inner circumference surface of the coil-spring accommodating portion 43C.

With this, the engagement hole 211 of the leaf spring 200 is firmly engaged with the engagement projection 43D of the coil-spring accommodating portion 43C (see FIG. 2) and the wire spring 320 is electrically connected, via the leaf spring 200 and the sheet metal 49, to the other leaf spring 200 which is arranged on the left side of the support frame 43 (LED head 41). Further, the pressing arm portion 322 is brought into contact with the grounding projection 313 of the metal plate 310 and the grounding plate 330.

The contact-arm portion 323 has a contact point 324 which is formed to be turned or folded back in a substantially "U"-shaped form. The contact point 324 is rockably movable with the coil-spring portion 321 as the rocking center. The contact point 324 is satisfactorily grounded since the contact point 324 is biased against the metal plate of the body 10.

As shown in FIG. 3, the grounding plate 330 is fixed to a plate-shaped piece 43J for positioning which is formed in the support frame 43 at each of the outer side portions of the support frame 43 in the left and right direction. The plate-shaped piece 43J is held between an unillustrated pressing arm and an unillustrated positioning member arranged in the body 10. Further, in a state that the plate-shaped piece 43J is positioned by being pressed against the positioning member with the pressing arm, the grounding plate 330 is brought into contact with a metal part which is provided on the pressing arm, and thus the grounding plate 330 is electrically grounded via this metal part.

As shown in FIGS. 6 and 7, each of the coil springs 47 is in contact with the grounding projection 313 of the metal plate 310, at the lower end portion of the coil spring 47. Further, the upper end portion of the coil spring 47, which is arranged on the right side, is in contact with the holder-side coil spring 340.

The holder-side coil spring 340 is provided on the holder 48 only at the right side portion of the holder 48, and has a coil-spring portion 341 and a spring-leg portion 342. The spring-leg portion 342 of the holder-side coil spring 340 makes contact with the coil spring 47, and the outer end portion of the coil-spring portion 341 in the left and right direction makes contact with a metal plate provided on the upper cover 12. Note that the metal plate of the upper cover 12 makes contact with the metal plate of the body 10.

As described above, the metal plate 310 on the right side is electrically grounded mainly via: a first route from the wire spring 320 and arriving, via the grounding plate 330, at the metal part of the pressing arm of the body 10; a second route from the wire spring 320 and arriving at the metal plate of the body 10; and a third route from the coil spring 47 and arriving, via the holder-side coil spring 340, at the metal plates of the upper cover 12 and the body 10. On the other hand, the metal plate 310 on the left side is electrically grounded mainly via the above-described first and second routes because the holder-side coil spring 340 is not provided on the left side.

Further, the metal plate 310 on the right side is grounded also via the first and second routes for the metal plate 310 on the left side, because the right-side metal plate 310 is electrically connected to the left-side metal plate 310 via the wire spring 320 on the right side, the leaf spring 200 on the right side, the sheet metal 49, the leaf spring 200 on the left side and the wire spring 320 on the left side. In a similar manner, the left-side metal plate 310 is grounded also via the first to third routes for the right-side metal plate 310. Therefore, the metal plates 310 on the left and right sides are electrically grounded via five routes.

<Eccentric Cams 45, 46>

As shown in FIGS. 2 and 3, the eccentric cams 45 and 46 adjust the spacing distance between the LED head 41 and the support frame 43, and are arranged, to be away from each other in the left and right direction, between the LED head 41 and the base portion 43A of the support frame 43. Each of the eccentric cams 45 and 46 presses the LED head 41 in the optical axis direction while being biased by the biasing force from the leaf spring 200.

The eccentric cam 46 located on the left side among the pair of eccentric cams 45, 46 is constructed to press the LED head 41 at one position; and the eccentric cam 45 located on the right side among the pair of eccentric cams 45, 46 is constructed to press the LED head 41 at two positions. Namely, the LED head 41 makes contact with all the eccentric cams 45, 46 only at three positions.

<Holder 48>

The holder 48 is made of resin, and mainly includes a base portion 48A which has an elongated shape extending in the left and right direction, and the hook 400 which is hooked to the support frame 43 to thereby support the support frame 43 movably upward and downward relative to the holder 48.

Pivot shaft portions 48B are provided on the base portion 48A, at both end surfaces of the base portion 48A, extending outward in the left and right directions respectively. The pivot shaft portions 48B are supported pivotably to the LED-attachment member 14 of the upper cover 12 to thereby make the holder 48 pivotable with respect to the upper cover 12. Further, the above-described holder-side coil spring 340 is attached to a pivot shaft portion 48B (not illustrated in the drawings), among the pivot shaft portions 48B, which is located on the right side.

The coil spring 47 is arranged between the base portion 48A and the support frame 43 (each of the coil-spring accommodating sections 43C), thereby pressing the support frame 43 in a direction away from the holder 48.

Two pieces (a plurality of pieces) of the hook 400 are provided on the holder 48 in the left and right direction (longitudinal direction of the LED head 41) at a predetermined spacing distance. Each of the hooks 400 is constructed to include a pair of arms 410 and a pair of pawls 420 each formed to be bent from an end portion of one of the arms 410 toward the support frame 43.

The arms 410 are each constructed to be elastically deformable, and are arranged in the support frame 43 on the both sides in the width direction of the support frame 43. Here, the term "width direction" means a direction orthogonal to the longitudinal direction of the LED head 41 and the optical axis direction of the light emitted from the LED head 41.

Further, in each of the pairs of arms 410, the arms 410 are arranged to be shifted in the left and right direction. More specifically, a pair of arms 410, among the pairs of arms 410, which constructs one hook 400 among the two hooks 400, are arranged such that the arms 410 are shifted in a direction different from another direction in which arms 410 belonging to the other hook 400 are shifted.

Namely, in the hook 400 on the right side, the arm 410 on the rear side is shifted leftward with respect to the arm 410 pairing with the rear-side arm 410 and arranged on the front side, while in the hook 400 on the left side, the arm 410 on the rear side is shifted rightward with respect to the arm 410 pairing with the rear-side arm 410 and arranged on the front side. With this, upon attaching the holder 48 to the support frame 43 in a state that the holder 48 is turned over from the posture (orientation) illustrated in the drawing, the arms 410 cannot fit with the recessed portions 43H of the support frame 43, respectively, thereby preventing any misassemble or incorrect assemble.

The pawls 420 are engaged with the holes 43G of the support frame 43 from below. In a state that the pawls 420 are engaged with the holes 43G, gap (clearance) is defined between the pair of arms 410 and the support frame 43. This makes it possible that the support frame 43 is movable frontward and rearward in a state that the support frame 43 is supported by the hooks 400.

Since the holder 48 is constructed as described above, it is possible that when the upper cover 12 is closed, the support frame 43 movable with respect to the holder 48 can be easily positioned with an unillustrated positioning member. Further, in a case, for example, that the rotational axis of the photoconductive drum 53 is eccentric with respect to the body of the photoconductive drum 53, due to manufacturing error, etc., and even if the LED head 41 and the support frame 43 are reciprocated upward and downward following the surface of the photoconductive drum 53 rotating in eccentric manner, it is possible to absorb the up and down reciprocation in the gap between the holder 48 and the support frame 43. Furthermore, when the upper cover 12 is opened, the biasing force of the coil spring 47 is applied only to the support frame 43, but not applied to the LED head 41.

Note that it is preferable that the holder 48 is formed to have such rigidity that the holder 48 is deformable more easily than the support frame 43. With this, even in a case, for example, that a strong force in the upward direction is applied to the support frame 43 and thus the biasing force of the coil spring 47 becomes excessively strong, the holder 48 is first deformed rather than the support frame 43, thereby making it possible to maintain the shape of the support frame 43 engaged with the positioning member of the body 10 and thus to maintain the correct positioning.

Owing to the constructions as described above, the following effects can be obtained in the embodiment. Since the roller shaft 300 is grounded via the metal plate 310, etc., it is possible to solve a problem such as false operation or malfunction of the LED head 41 which is otherwise caused when the roll shaft 300 is electrically floated. Further, since the metal plate 310 which fixes the roller shaft 300 to the support frame 43 is used for the grounding purpose as well, there is no need to provide any additional part for the grounding purpose. Therefore, it is possible to suitably arrange the parts or components around the roller shaft 300 and to decrease the number of the parts.

Since the positioning portions B11 for positioning the roller shaft 300 are formed in the support frame 43, it is possible to precisely position the roller shaft 300 with respect to the support frame 43.

Since the positioning portions B11 are formed in recess-shape, it is possible to form a positioning plane more precisely than in a case that the positioning portions are formed in a hole-shape.

The projection portions 43F projecting toward the LED head 41 are formed on the support frame 43. Therefore, even when a force is applied to the LED head 41 from below to cause the LED head 41 warp with the eccentric cams 45, 46 as the warpage points, such warpage of the LED head 41 can be suppressed by the projection portions 43F. With this, it is possible to suppress the deformation of the LED head 41 and to thus improve the image quality.

Note that it is also possible to suppress the deformation of the LED head 41 by lowering, as a whole, the lower surface of the base portion 43A of the support frame 43. However, the precise control can be performed more easily and precisely with the small-sized projection portions 43F as in the embodiment, than lowering the entire lower surface of the base portion 43A.

A plurality of pieces of the projection portion 43F are arranged on the support frame 43 in the longitudinal direction of the LED head 41 at a predetermined spacing distance. Accordingly, even if a power is applied to the LED head 41 at any positions in the longitudinal direction of the LED head 41, it is possible to suppress the warpage of the LED head 41 at each of such positions in an assured manner.

Each of the projection portions 43F is formed to have a height such that, when the eccentric cams 45 and 46 are in the phase in which the LED head 41 approaches closest to the base portion 43A, each of the projection portions 43F does not make contact with the LED head 41. Accordingly, it is possible to secure large adjusting margin for the eccentric cams 45 and 46.

Since the LED head 41 is reinforced with the metal sheet 49 extending in the longitudinal direction of the LED head 41, it is possible to suppress the warpage of the LED head 41 securely.

Since the covers 100, which are made of resin and which extends (projects) downward to a position below the light-exit surface of the lens array 41C, are provided on the both end portions of the lens array 41C, it is possible to easily perform cleaning operation for the lens array 41C and to suppress the breakage of any cloth (cleaning cloth), etc., thereby making it possible to maintain the image quality satisfactorily.

Since the lens array 41C is constructed of a plurality of GRIN lens having the flat light-exit surfaces, it is possible to easily clean the flat light-exit surfaces with a cloth, etc.

Since the LED head 41 and the covers 100 are held by the leaf spring 200 and the support frame 43, it is possible to construct a part for fixing the LED head 41 to the support frame 43 and a part for fixing the cover 100 to the LED head 41 as one leaf spring 200, thereby making it possible to reduce the number of parts. Further, since the cover 100 is pressed against and fixed to the LED head 41 with the leaf spring 200, there is no need to form a recess, etc. in the LED head 41 for the purpose of hooking the cover 100 and attaching the cover 100 to the LED head 41, thus making it possible to enhance the rigidity of the LED head 41.

By supporting the support frame 43, which supports the LED unit 41, with the holder 48 such that the support frame 43 is movable relative to the holder 48 and by proving the coil springs 47 between the support frame 43 and the holder 48, it is possible to prevent the biasing force of the coil springs 47 from applying to the LED head 41 when the upper cover 12 is opened, thereby suppressing the deformation of the LED head 41.

Since the plurality of hooks 400 are provided on the holder 48 with a predetermined spacing distance in the longitudinal direction of the LED head 41, it is possible to stably support the support frame 43 having elongated shape with the plurality of hooks 400.

Since the gap is provided between each of the arms 410 of the hook 400 and the support frame 43 to thereby make the support frame 43 movable frontward and rearward with respect to the holder 48, it is possible to easily position the LED head 41 in the front and rear direction.

Since the arms 410 of each of the pair of hooks 400 are shifted in the longitudinal direction of the LED head 41, it is possible to easily produce the holder 48 with a resin by the injection molding using a die of which pull-out direction (draft direction) is the front and rear direction of the holder 48. Further, since the arms 410 are shifted in the longitudinal direction, it is possible to form the pawls 420 to be long, thereby supporting the support frame 43 assuredly with the pawls 420 of the hooks 400.

Since the shift direction in which the arms 410 on the right side are shifted from each other is different from a shift direction in which the arms 410 on the left side are shifted from each other, and since the recessed portions 43H which can accommodate the arms 410 respectively are formed in the support frame 43, it is possible to prevent mis-assembly of the holder 48 and the support frame 43.

The holder 48 is made pivotable with respect to the upper cover 12. Accordingly, when the upper cover 12 is opened upwardly, the end portion of the LED unit 40 is always oriented or directed downward due to the gravity, and thus it is possible to prevent the end portion of the LED unit 40 from jutting toward the user when the upper cover 12 is opened. Further, only the connecting section between the upper cover 12 and the holder 48 is allowed to be pivotable. Therefore, it is possible to suppress any unnecessary movement of the LED head 41 with respect to the upper cover 12 and thus to position the LED head 41 correctly, than in a case, for example, in which the connecting section between the upper cover and the holder is constructed of an elongated hole and a columnar-shaped projection to be pivotable as well as movable in the optical axis direction.

Note that the present invention is not limited to the embodiment as described above, and is applicable in various forms as exemplified below.

In the embodiment, the positioning portions B11 are formed as a semicircular recess. However, the present invention is not limited to this, and it is allowable that the positioning portions B11 are formed to have a "V"-shaped shape, a "U"-shaped shape, etc. Further, the positioning part may be hole-shaped, instead of the recess-shaped.

In the embodiment, the LED head 41 provided with the plurality of LED arrays 41A and the plurality of GRIN lenses which are aligned in a single row in the left and right direction is adopted as the exposure member. However, the present invention is not limited to this. For example, it is allowable to adopt, as the exposure member, a LED head having a plurality of LEDs, etc. which are aligned in a plurality of rows, arranged in front and rear direction, each extending in the left and right direction. Alternatively, it is allowable to construct a plurality of blinking sections with one piece of light-emitting element such as an LED or a fluorescent light, and optical shutters formed of a plurality of liquid-crystal elements or PLZT elements which are aligned in the left and right direction and arranged at the outside of the light-emitting element; and to adopt an exposure element which is provided with such blinking sections as described above. Further alternatively, the light source of the exposure member is not limited to the LED, and may be an EL element (electro-luminescence element), a fluorescent substance or body, etc.

In the embodiment, the present invention is applied to the color printer 1. However, the present invention is not limited to this, and is applicable to an image forming apparatus, other than the color printer, such as a copy machine, a multi-function machine, etc. In the embodiment, the photoconductive drum 53 is adopted as the photoconductive body. However, the present invention is not limited to this, and it is allowable to adopt, for example, a belt-shaped photoconductive body.

In the embodiment, the eccentric cams 45 and 46 are adopted as the adjusting member. However, the present invention is not limited to this, and it is allowable to adopt a screw which advances/retreats in the axis direction, a cam other than the eccentric cam (for example, an egg-shaped cam), etc.

In the embodiment, the projection portions 43F are provided on the support frame 43. However, the present invention is not limited to this, and it is allowable to provide the projection portions 43F on the LED head 41. In this case also, it is possible to suppress the warpage of the LED head 41.

Note that the projection portions 43F and the LED head 41 may be adhered to each other with an adhesive (in a case that the projection portions 43F are provided on the LED head 41, the projection portions 43F and the support frame 43 may be adhered to each other with adhesive). This makes it possible to stably support the LED head 41 with respect to the support frame 43.

In the embodiment, the cover 100 and the leaf spring 200 are constructed as separate parts. However, the present invention is not limited to this, and the cover and the elastic or resilient member may be constructed with a resin as an integrated part. This makes it possible to further reduce the number of parts. Note that as an example in which the cover and the resilient member are formed as an integrated part, it is possible to adopt a construction in which the cover 100 and the leaf spring 200 described above in the embodiment are constructed with a resin as an integrated part, a construction in which the cover and a binding strap are constructed with a resin as an integrated part, etc.

In the embodiment, the leaf spring 200 is adopted as the resilient member (elastic member). However, the present invention is not limited to this, and the resilient member may be a wire spring, etc.

In the embodiment, the eccentric cams 45 and 46 are provided between the support frame 43 and the LED head 41. However, the present invention is not limited to this, and it is allowable that the LED head 41 is fixed directly to the support frame 43.

In the embodiment, the coil spring 47 is adopted as the pressing member. However, the present invention is not limited to this, and it is allowable to adopt a torsion spring, a leaf spring, etc.

In the embodiment, the mis-assembly is prevented by making the pair of arms 410 at the right side be shifted from each other in a direction different from a direction in which the pair of arms 410 at the left side are shifted from each other. However, the present invention is not limited to this. It is allowable to prevent the mis-assembly by making the arms 410 at the right side be shifted from each other by a shift amount which is different from a shift amount by which the arms 410 at the left side are shifted from each other.

In the embodiment, the upper cover 12 is adopted as the opening/closing cover. However, the present invention is not limited to this; and the opening/closing cover may be a front cover, for example.

Figure 8:
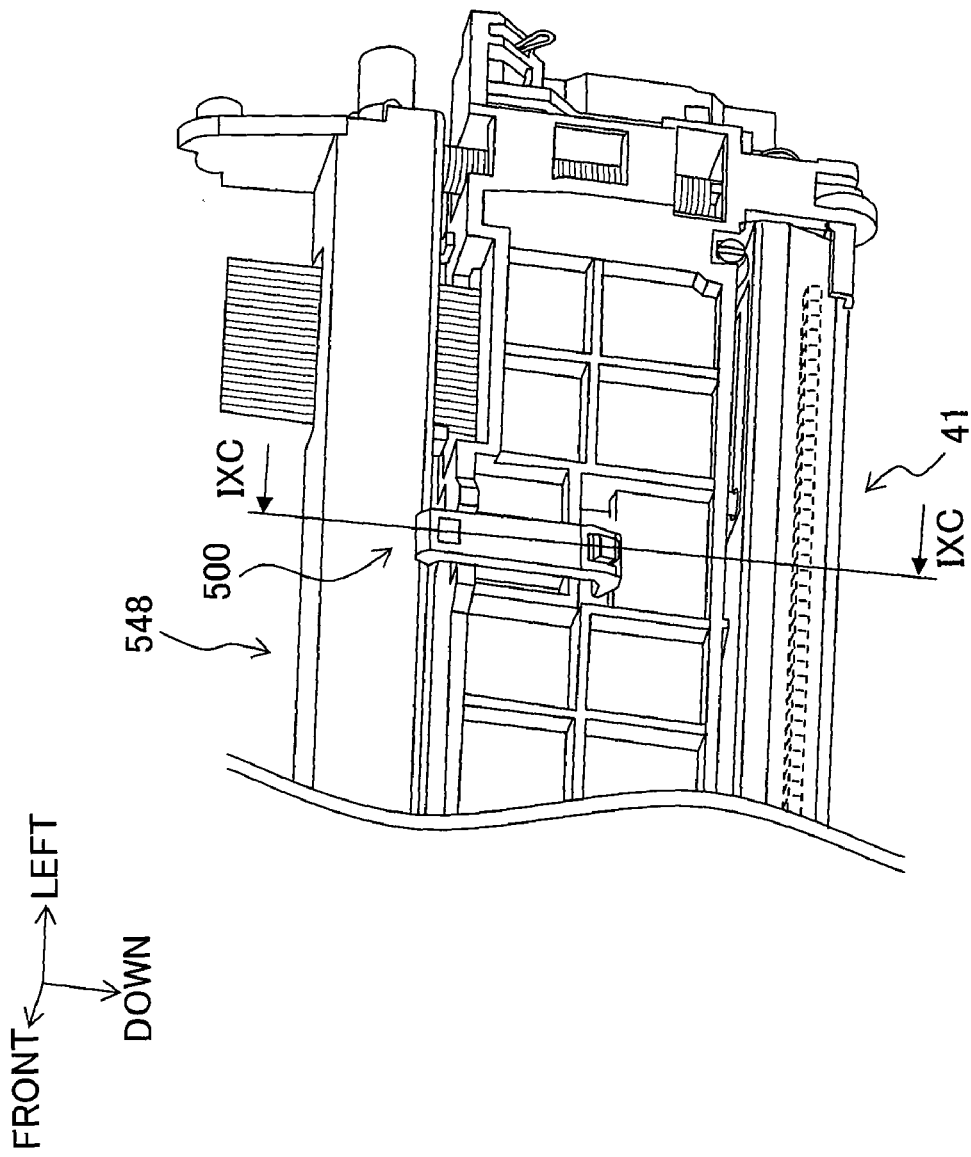
FIG. 8 is a partial perspective view of a holder having a hook according to a modification of the present invention.

Note that the hook 400 formed in the holder 48 are not limited to the shape of the above-described embodiment. For example, as shown in FIG. 8, a holder 548 may have a hook 500, instead of the hook 400, which will be explained below. Here, the holder 548 has a construction same as that of the holder 48 except that the hook 500 has a construction different from that of the hook 400. Accordingly, a part or component of the holder 548 which has the same construction as that of the holder 48 will be assigned with a same reference numeral as that of the holder 48, and the explanation therefore will be omitted.

Figure 9A:
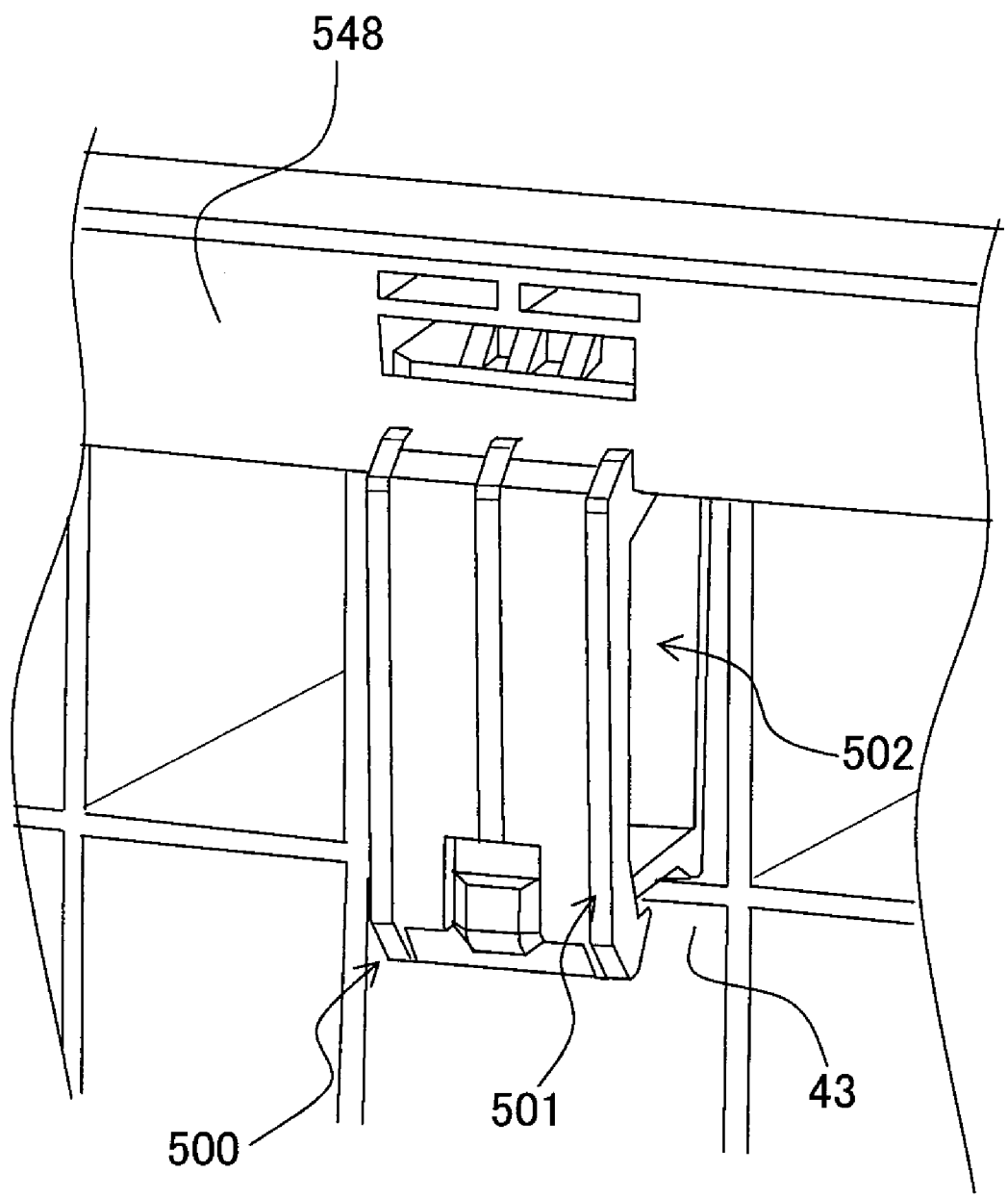
FIG. 9A is a perspective view showing the hook according to a modification of the embodiment of the present invention.

As shown in FIG. 9A, the hook 500 has a first hook portion 501 which is formed integrally with the holder 548 and which is hooked to the support frame 43, and a second hook portion 502 which is formed as a separate member from the holder 548 and which is hooked to the first hook portion 501 while sandwiching the support frame 43 between the second hook portion 502 and the first hook portion 501. As shown in FIG. 9C, the first hook portion 501 has an integrated portion 509 which is formed integrally with a base portion 48A of the holder 548, an arm 510 which extends from the integrated portion 509 in the optical axis direction. At an end portion of the arm 510, a pawl 510A is formed to be bent toward the support frame 43. An insert port 510B is formed in the arm 510 at a portion in the vicinity of the end portion of the arm 510 (on the side closer to the base portion 48A than the pawl 510 with respect to the optical axis direction). A second extending portion 502C of the second hook portion 502 (to be described later on) is inserted to the insert port 510B. Here, a surface, of the pawl 510A, on the side opposite to the support frame 43, functions as a second base portion 510C to which a second pawl 502E of the second hook portion 502 (to be described later on) is hooked. Further, an insert port 509A is formed in the integrated portion 509A of the first hook portion 501, and a first extending portion 502B of the second hook portion 502 (to be described later on) is inserted to the insert port 509A; and a first base portion 509B is formed on the inner surface (upper inner surface), of the integrated portion 509, which defines the insert port 509A, as a projection extending in the optical axis direction and to which a first pawl 502D of the second hook portion 502 (to be described later on) is hooked.

Figure 9B:
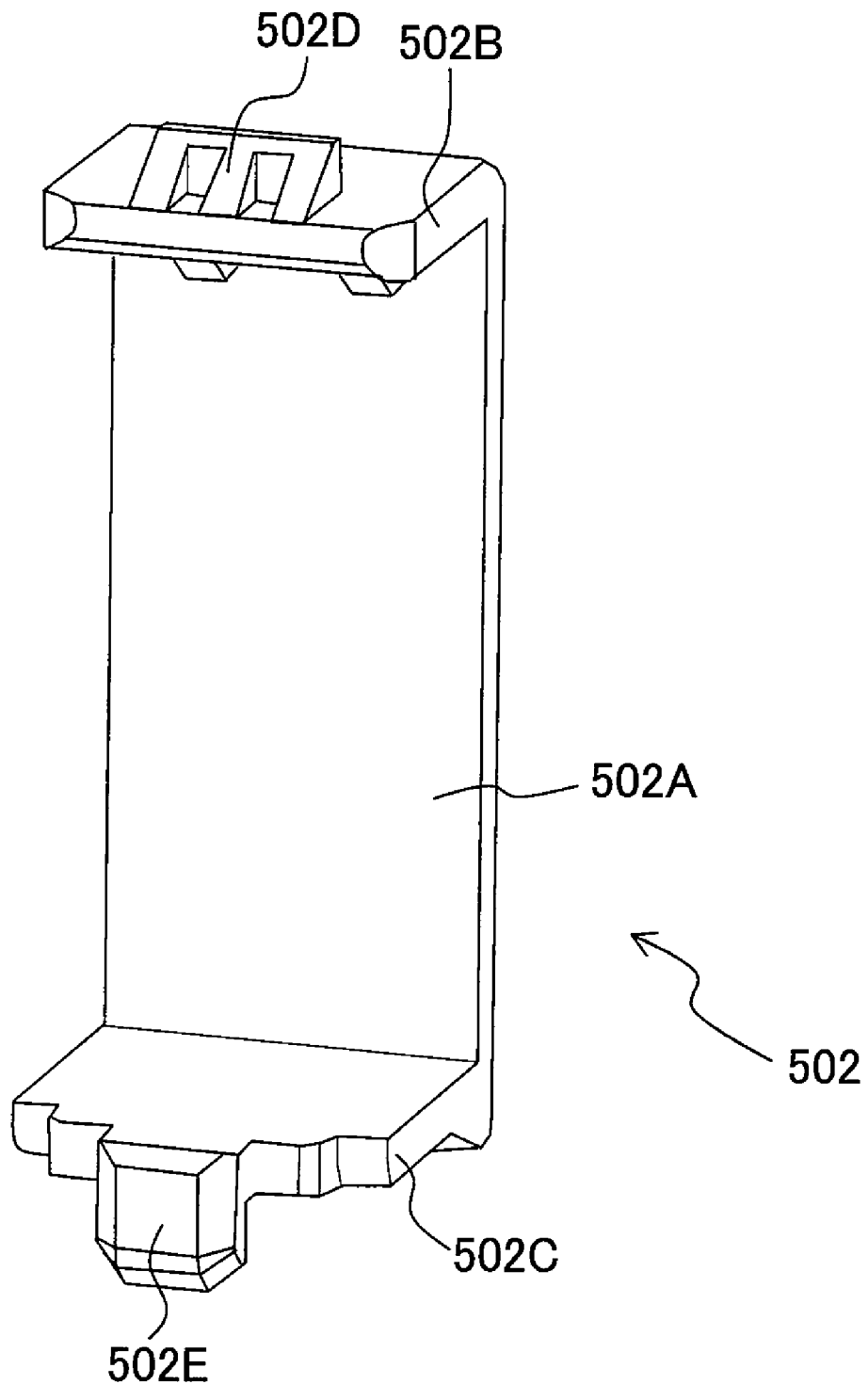
FIG. 9B is a perspective view of a second hook portion of the hook and FIG. 9C is a sectional view taken along a IXC-IXC line of FIG. 8.
Figure 9C:
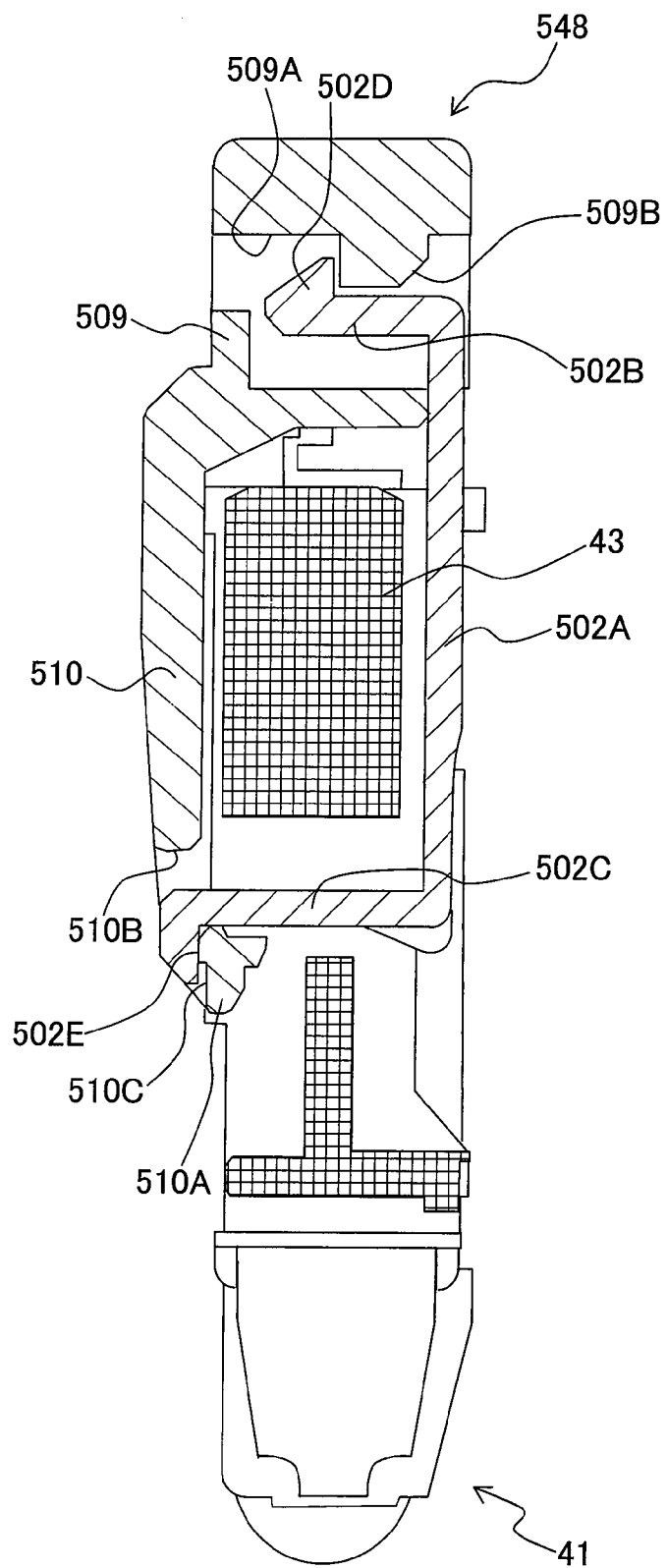

As shown in FIG. 9B, the second hook portion 502 has a second arm 502A which is a plate-shaped member elongated in one direction, a first extending portion 502B and a second extending portion 502C each of which extends in a direction perpendicular to the plate surface of the arm 502A, a first pawl 502D and a second pawl 502E which are formed in the first and second extending portions 502B and 502C at end portions thereof respectively and each of which has a triangular cross section. Note that the first pawl 502D and the second pawl 502E are formed, at the end portions of the first and second extending portions 502B and 502C respectively so as to project in a direction away from each other (extending outwardly) with respect to the extending direction of the arm 502A.

As shown in FIG. 9C, the first extending portion 502B of the second hook portion 502 is inserted into the insert port 509A formed in the integrated portion 509 of the first hook portion 501, and the first pawl 502D of the second hook portion 502 is engaged with the first base portion 509B of the first hook portion 501. Further, the second extending portion 502C of the second hook portion 502 is inserted into the insert port 510B formed in the arm 502A of the first hook portion 501, and the second pawl 502E of the second hook portion 502 is engaged with the second base portion 510C of the first hook portion 501. In such a manner, by making the second hook portion 502 be engaged with the first hook portion 501, it is possible to sandwich the support frame 43 with the first and second hook portions 501 and 502, thereby making it possible to support the support frame 43 assuredly.

What is claimed is:

1. An exposure apparatus which is configured to expose an object, comprising:
    an exposure member which has a plurality of blinking sections and which is elongated in a predetermined longitudinal direction;
    a support frame which is configured to support the exposure member;
    a holder which is configured to support the support frame to be movable relative to the holder; and
    a pressing member which is provided between the holder and the support frame and which is configured to press the support frame in a direction away from the holder,
    wherein the holder is provided with a hook portion which is hooked to the support frame to support the support frame,
    the hook portion is formed as a plurality of hook portions, and the hook portions are arranged on the holder at a predetermined spacing distance in the longitudinal direction of the exposure member,
    the support frame is a plate-shaped member which is arranged along the longitudinal direction,
    the hook portions include pairs of arms and pairs of pawls respectively, arms of each of the pairs of arms being elastically deformable and arranged in the support frame such that the arms sandwich the support frame from both sides respectively, pawls of each of the pairs of pawls being formed in the arms, respectively, the pawls being bent toward the support frame from end portions of the arms respectively,
    holes or grooves are formed in the frame in which the pairs of pawls are engaged, respectively, and
    a gap is provided between each of the pairs of arms and the support frame in a state that the pairs of pawls are engaged in the holes or the grooves, respectively.

2. The exposure apparatus according to claim 1, wherein the arms of each of the pair of arms are shifted from each other in the longitudinal direction.

3. The exposure apparatus according to claim 2, wherein a shift direction or a shift amount of the arms of a pair of arms, among the pairs of arms, provided on one of the hook portions is different from a shift direction or shift amount of the arms of other of the pair of arms provided on other of the hook portions; and
    a plurality of recessed portions are formed in the support frame corresponding to the arms, respectively, each of the recessed portions being configured to accommodate at least a portion of one of the arms.

4. The exposure apparatus according to claim 1, wherein an accommodating portion having an elongated hole shape is formed in the support frame; and
    the pressing member is accommodated in the accommodating portion.

5. The exposure apparatus according to claim 4, wherein the pressing member is a coil spring, and an end of the coil spring is grounded.

6. An exposure apparatus which is configured to expose an object, comprising:
    an exposure member which has a plurality of blinking sections and which is elongated in a predetermined longitudinal direction;
    a support frame which is configured to support the exposure member;
    a holder which is configured to support the support frame to be movable relative to the holder; and
    a pressing member which is provided between the holder and the support frame and which is configured to press the support frame in a direction away from the holder,
    wherein the holder is provided with a hook portion which is configured to be hooked to the support frame to support the support frame, and
    wherein the hook portion has a first hook portion which is formed integrally with the holder and a second hook portion which is formed separately from the holder.

7. The exposure apparatus according to claim 6, wherein the first hook portion has an integrated portion which is formed integrally with the holder, an arm which extends from the integrated portion toward the exposure member, and a pawl which is formed at an end portion of the arm and which is engaged with the support frame, insert holes being formed respectively in the integrated portion and in the arm at an area located closer to the integrated portion than the pawl;

the second hook portion has a second arm which is plate-shaped and is arranged to face the arm portion of the first hook portion and which extends in an extending direction of the arm portion; and two extending portions which extend, toward the arm portion of the first hook portion, from both end portions of the second arm portion respectively and which are inserted to the insert holes, respectively; and two pawls which are formed at the both end portions of the second arm portion respectively and which are hooked to the first hook portion; and the support frame is supported by the holder when the second hook portion is hooked to the first hook portion so that the support frame is sandwiched between the first and second hook portions.

8. An image forming apparatus which is configured to form an image on an object, the image forming apparatus comprising:

an exposure apparatus which is configured to expose and object including:

an exposure member which has a plurality of blinking sections and which is elongated in a predetermined longitudinal direction;

a support frame which is configured to support the exposure member;

a holder which is configured to support the support frame to be movable relative to the holder; and a pressing member which is provided between the holder and the support frame and which is configured to press the support frame in a direction away from the holder, wherein the holder is provided with a hook portion which is hooked to the support frame to support the support frame, the hook portion is formed as a plurality of hook portions, and the hook portions are arranged on the holder at a predetermined spacing distance in the longitudinal direction of the exposure member, the support frame is a plate-shaped member which is arranged along the longitudinal direction, the hook portions include pairs of arms and pairs of pawls respectively, arms of each of the pairs of arms being elastically deformable and arranged in the support frame such that the arms sandwich the support frame from both sides respectively, pawls of each of the pairs of pawls being formed in the arms, respectively, the pawls being bent toward the support frame from end portions of the arms respectively, holes or grooves are formed in the frame in which the pairs of pawls are engaged, respectively, and a gap is provided between each of the pairs of arms and the support frame in a state that the pairs of pawls are engaged in the holes or the grooves, respectively;

a photoconductive body which is exposed by the exposure apparatus so that an electrostatic latent image is formed on a surface of the photoconductive body;

a transfer unit which is configured to transfer the electrostatic latent image, formed on the photoconductive body, to the object; and a fixing unit which is configured to fix the image, transferred to the object by the transfer unit, on the object.

9. The image forming apparatus according to claim 8, further comprising a body in which the exposure apparatus and the photoconductive body are arranged, in which a predetermined opening is formed, and which includes a cover which is configured to openably cover the opening;

wherein the holder is attached to the cover to be pivotable with respect to the cover.

* * * * *

UNITED STATES PATENT AND TRADEMARK OFFICE
CERTIFICATE OF CORRECTION

PATENT NO. : 8,310,515 B2
APPLICATION NO. : 12/547848
DATED : November 13, 2012
INVENTOR(S) : Junichi Yokio et al.

It is certified that error appears in the above-identified patent and that said Letters Patent is hereby corrected as shown below:

In the Claims:

In Column 17, Claim 8, Line 21:
Please delete "expose and object" and insert --expose an object--.

Signed and Sealed this
Tenth Day of September, 2013

Teresa Stanek Rea
*Acting Director of the United States Patent and Trademark Office*